July 5, 1960
H. A. PRICE
2,943,594
CELL FOR TESTING HYDROCARBON FUEL
Filed Nov. 19, 1958
2 Sheets-Sheet 1
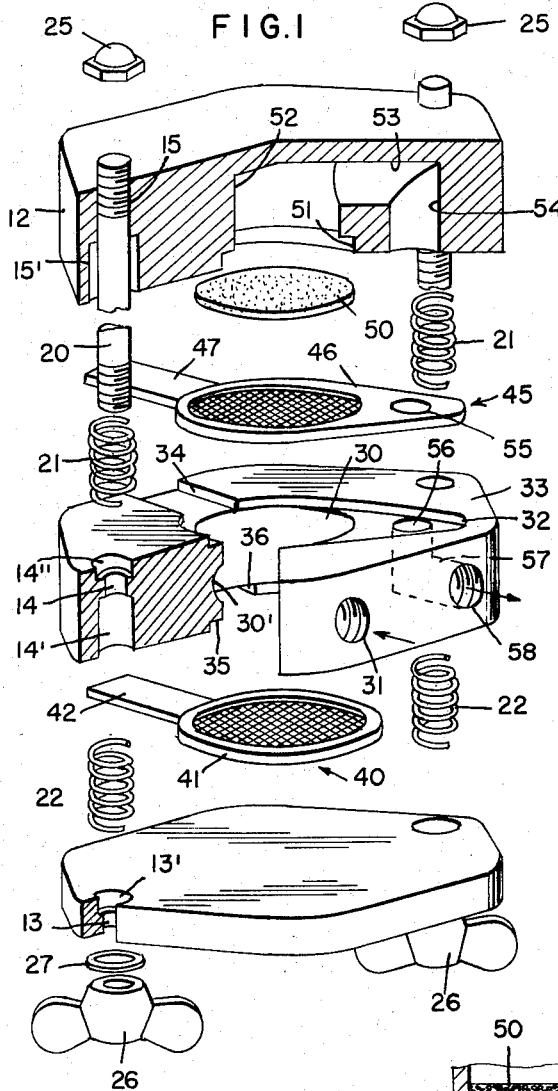
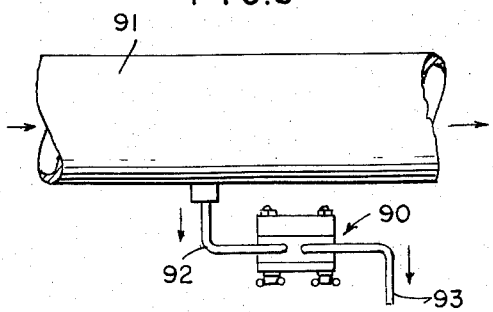
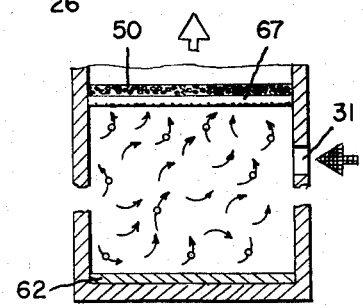
INVENTOR:
Harold A. Price
BY
Arthur Middleton
ATTY

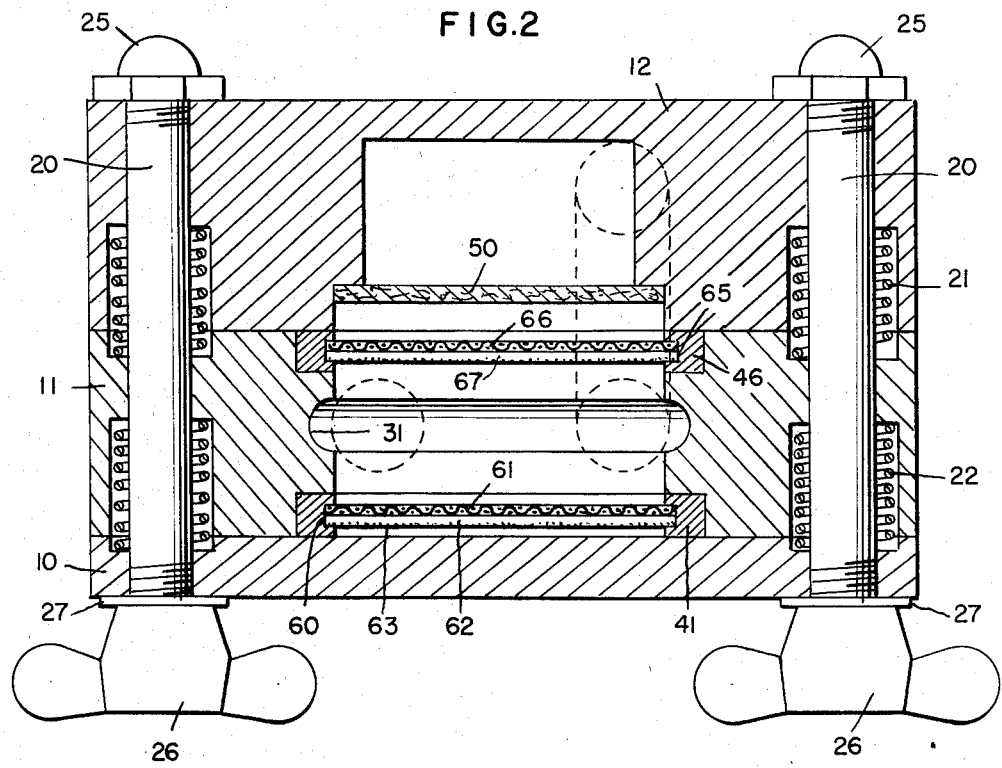
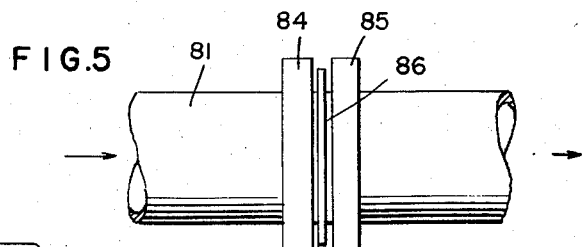
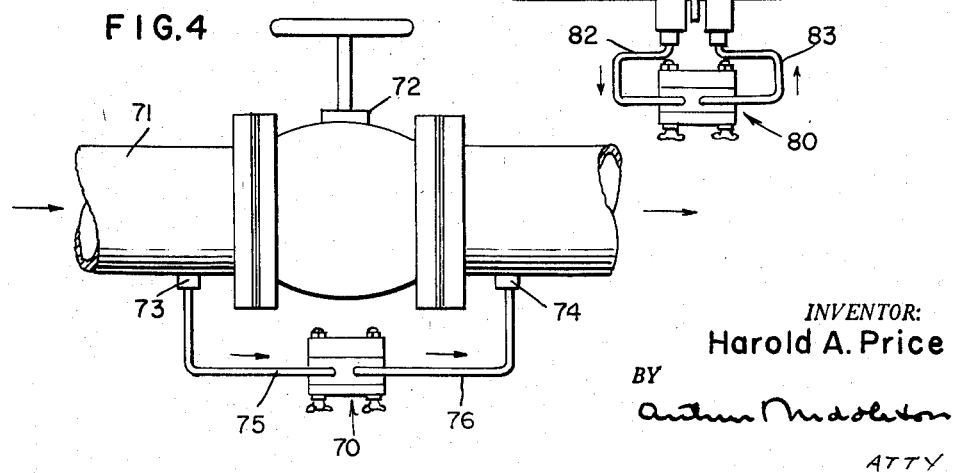

United States Patent Office 2,943,594
Patented July 5, 1960

2,943,594

CELL FOR TESTING HYDROCARBON FUEL

Harold A. Price, Lafayette, Calif., assignor to Permanent Filter Corporation, Los Angeles, Calif., a corporation of California Filed Nov. 19, 1958, Ser. No. 774,903

13 Claims. (Cl. 116—114)

The present invention relates to a new and novel cell for testing hydrocarbon fuels, and more particularly to a test cell adapted to detect entrained water and to simultaneously remove solids from fluids passed therethrough.

The present invention is particularly adapted for testing fuels as utilized in aircraft and guided missiles wherein heavy distillates are employed and the fuels must be as nearly completely free of entrained water and solids as possible in order to provide adequate safety during operation of the aircraft or missiles. The presence of water or submicronic solids in such fuel is critical, since the operation of the jet engines utilizing the fuel is seriously hindered by the presence of water or such solids, and in fact these elements in the fuel can cause the jet engine to become completely inoperative.

The failure of jet engines in flight due to the presence of water or solids in the fuel is obviously a serious matter, and becomes particularly dangerous when the fuels are being employed in commercial aircraft such that the lives of the passengers, in addition to the very valuable equipment, are endangered due to possible failure of the engines. Of course, reliability is also an essential element in guided missiles as used in military operations since failure of the engines completely destroys the tactical effectiveness of such weapons.

As a result of the fairly common failure of jet engines due to the presence of entrained water and submicronic solids, extensive measures have been employed in an attempt to completely eliminate such water and solids from the fuel. Regardless of the efficiency of the initial processing of the fuel, transportation and handling of the fuel often causes additional water and solids to accumulate in the fuel such that when the fuel is actually pumped into an aircraft, for example, the fuel which originally would have been perfectly satisfactory is then not suitable for use. As a result, it is very desirable to provide a simple and efficient means by which the fuel may be quickly and reliably tested in order to determine whether or not the fuel has an excessive amount of water or submicronic solids therein.

The present invention provides a very compact and simple structure for determining the presence of entrained water and submicronic solids in hydrocarbon fuels. Prior art devices for accomplishing this purpose have proved unsatisfactory due to the complexity and relatively large size thereof, and in addition particularly to the requirement of relatively large amounts of water which must be entained in the fuel in order to obtain accurate results. The present invention provides an arrangement wherein very minute quantities of water which may be entrained in the hydrocarbon fuel are readily detected, and in addition submicronic particles are also effectively separated from the fuel and detected by the test cell according to the present invention.

The new and novel test cell comprises a compact body means which may be assembled and disassembled in a very efficacious manner, and is adapted to be inserted in a suitable manner in a fuel line such that it can accurately sample fuel as it is being pumped from one position to another. In order to provide a representative sampling, the test cell is run on a continuous sampling basis or, in other words, it is connected in the main fuel pumping line such that a portion of the fuel passing through the pumping line continuously passes through the test cell. While it is possible to pass the entire fluid flow through the cell, it is considered adequate to merely pass a continuous small percentage of the flow through the test cell in order to obtain accurate sampling.

A water indicating member is mounted within a hollow cavity in the central portion of the body means and is so disposed that the lower surface thereof faces away from the cavity and away from the fluid flow. This lower surface of the member is impregnated with a water soluble dye which is substantially completely inert to hydrocarbons, and the body means is so arranged that a turbulent flow is set up within the cavity. In this manner, the fuel passing through the test cell comes in contact with the water indicating member which has also been treated so as to be readily wettable, and accordingly any water which is present in the fuel will cause the dye impregnated in the lower surface to be deposited and become visible on the opposite surface of the member, thereby providing a very effective and clear indication of the presence of entrained water in the fuel. This water indicating member is mounted within a support member which can be easily mounted and dismounted in the body means.

A hydrophobic filter is also mounted within the body means within a support member which may be easily mounted or dismounted from the body means, and this hydrophobic filter serves a dual purpose. It is of such a nature so as to separate submicronic solid particles out of the fuel in order to provide an indication of the presence of such particles in the fuel, and in addition it serves to coalesce small droplets of water which may be present in the fuel such that they will be carried downwardly into engagement with the water indicating member due to the turbulence existing within the cavity within the body means. In this manner, detection of the entrained water in the fuel is additionally insured.

A further filter member in the form of a plurality of small sintered bronze spheres which are connected to each other at mutual tangential points of contact is supported within the cap member of the body means and closely adjacent to the hydrophobic filter previously described. An inlet port is provided through the spacer member of the body means and communicating with the cavity, and an outlet port is also formed within the spacer member, this outlet port being in communication with an outlet passage provided in the cap member which terminates in a cavity formed in the cap member aligned with the cavity in the spacer member. The fluid flows in through the inlet port and then the turbulence within the cavity and the spacer member causes the fuel to be efficiently engaged with the water indicating member, whereupon the fuel passes upwardly through the hydrophobic filter and the sintered bronze filter and out through the outlet port of the device.

An object of the present invention is the provision of a cell for testing hydrocarbon fuels which is particularly adapted for determining the presence of water and submicronic solid particles in the fuel.

Another object of the invention is to provide a cell for testing hydrocarbon fuels which is sensitive to minute amounts of water and which efficiently filters out submicronic particles from the fuel passing therethrough.

A further object of the invention is to provide a cell for testing hydrocarbon fuels which is very simple, inexpensive and compact in construction, and yet which is very reliable and efficient in operation.

A still further object of the invention is the provision of a cell for testing hydrocarbon fuels which may be readily assembled and disassembled.

Other objects and many attendant advantages of the invention will become more apparent when considered in connection with the accompanying specification and drawings wherein:

Fig. 1 is an exploded view of the test cell according to the present invention;

Fig. 2 is a longitudinal section of the test cell in operative position;

Fig. 3 is a schematic view illustrating the general principle of operation of the device;

Fig. 4 illustrates the test cell connected in a main fuel line;

Fig. 5 illustrates a test cell mounted in a slightly different manner in a fuel line; and Fig. 6 illustrates still another arrangement for connecting the test cell in a fuel line.

Referring now to the drawings wherein like reference characters designate corresponding parts throughout the several views, there is shown in Fig. 1 a body means composed of three major portions including a base member 10, a spacer member 11 and a cap member 12. These body portions have aligned openings 13, 14 and 15 formed therethrough, and adjacent enlarged portions 13', 14', 14'' and 15' are formed adjacent the respective openings. A pair of openings is formed in each of the body portions, and a pair of stud bolts 20 having opposite threaded end portions is adapted to extend through the aligned openings with a pair of springs 21 disposed between cap member 12 and spacer member 11 and fitted within enlarged portions 15' and 14'', and with a pair of springs 22 disposed between spacer member 11 and base member 10 and fitting within enlarged portions 13' and 14'. Acorn type cap nuts 25 are adapted to be threaded on the upper ends of stud bolts 20 and wing nuts 26 are threaded on the lower ends of the stud bolts with washers 27 disposed between the wing nuts and the lower surface of the base member 10. It is apparent that springs 21 and 22 are adapted to be compressed when the cap nuts and wing bolts are tightened on the stud bolts for securing the three body portions together, and yet when the wing nuts are loosened, springs 21 and 22 will urge the body portions away from one another so as to facilitate disassembly of the body means.

Spacer member 11 is provided with a central cavity 30 formed therein, and an inlet port 31 is in communication with cavity 30 and has a threaded outer end for receiving a suitable fitting. An annular groove 30' is formed in the spacer member surrounding the midportion of cavity 30. A recessed portion 32 is formed in the upper surface 33 of the spacer member and surrounds the upper end of cavity 30 and has a somewhat oval configuration. A slot 34 is also formed in the upper surface 33 of the spacer member and is in communication with the recess 32. In a similar manner, the lower surface of the spacer member has formed therein a substantially circular recess 35 surrounding the lower end of cavity 30. A slot 36 similar to slot 34 is formed in the lower surface of the spacer member and is in communication with recess 35.

A first support member indicated generally by reference numeral 40 includes a substantially annular ring portion 41, the details of construction of which will be more fully hereinafter described, and an elongated flattened substantially rectangular handle portion 42 is formed integral with ring portion 41. Handle portion 42 is adapted to fit snugly within slot 36 such that the lower surface of the handle portion and ring 41 will be substantially flush with the lower surface of the spacer member.

A second support member indicated generally by reference numeral 45 includes a somewhat oval portion 46 having an outer configuration complementary to the recess 32 formed in the upper surface of the spacer member, the details of construction of member 46 being more fully hereinafter set forth. A handle portion 47 similar to handle portion 42 is formed integral with oval portion 46 and is adapted to fit snugly within slot 34 in the upper surface of the spacer member such that the upper surface of oval portion 46 and handle portion 47 are substantially flush with the upper surface 33 of the spacer member.

A substantially disc-shaped filter member 50 is formed of sintered bronze spheres held together at mutual tangential points of contact. These spheres have a diameter of approximately 40 microns and there are about 40% voids in the body of the filter member. This filter member or frit 50 is adapted to be press fitted within a cylindrical opening 51 formed in the lower portion of cap member 12.

A cavity 52 of less diameter than opening 51 is connected therewith, and is in communication with a laterally extending outlet passage 53 which connects with a downwardly extending outlet passage 54. An opening 55 formed in the second support member 45 is adapted to be aligned with passage 54 in the cap member and also is adapted to be aligned with an opening 56 formed in the lower surface of recessed portion 32 in the spacer member. Opening 56 communicates through the intermediary of a downwardly and laterally extending passage 57 with a threaded outlet port 58 formed in the spacer member.

Fig. 2 illustrates the body means in clamped operative position wherein the cap nuts 25 have been applied to the upper ends of stud bolts 20 and, wing nuts 26 have been secured to the lower ends of the stud bolts. It is evident that a closed test cell is provided, and that the various elements are securely locked together in a fluid tight arrangement. Body portions 10, 11 and 12 may be formed of any suitable substance such as aluminum, in order to conserve weight, or clear plastic may be employed if it is desired to observe the action occurring in the interior of the test cell.

As seen in Fig. 2, annular portion 41 of the first support member 40 has an annular groove 60 formed therein. A substantially disc-shaped screen member 61 is mounted within groove 60, and a disc-like water indicating member 62 is also disposed within groove 60 closely adjacent screen portion 61. Disc-like members 61 and 62 are accordingly maintained in operative position within the body means, the lower surface 63 of the water indicating member being disposed downwardly or away from the cavity formed within the body means and away from the fluid passing through the test cell.

Water indicating member 62 comprises a suitable substance which is adapted to absorb fluids, and preferably filter paper manufactured by the Milipore Filter Corporation and identified as grade AA is employed for this purpose. This type of filter paper is made readily wettable prior to utilization in the invention device by treating it with a suitable wetting agent, such as 90° alkyl aryl sulphonate or the like. The lower surface 63 of the water indicating member is impregnated with a dye which is water soluble and completely inert to hydrocarbons. A suitable dye for use in the present invention is identified as Calcocid blue black Ex CONC manufactured by the American Cyanamid Company. The dye, being water soluble, will be deposited upon the upper surface of water indicating member 62 whenever any entrained water within the tested fluid contacts the readily wettable member 62. In this manner, a very reliable and efficient method is provided for indicating the presence of water in the fuel.

As a modification of the device, the water indicating means mounted within the support member 40 may comprise, in addition to the disc-shaped screen member 61, a disc of filter paper formed of the material of member 62 which is impregnated with a water soluble dye as hereinbefore discussed. Interposed between the screen member 61 and the disc of Milipore filter paper, a disc of cotton cellulose hydrophilic filter paper is provided and seated within groove 60 whereby the fluid within the device first passes through the cellulose filter paper before impinging upon the dye impregnated Milipore filter paper. The intermediate hydrophilic cotton cellulose filter paper is preferably of the type identified as Watman No. 12 manufactured by W & R Balston Ltd. of England. This hydrophilic filter paper is treated with a wetting agent as discussed previously, in order to provide the proper mode of operation. When water is present in the tested fluid, the dye will be deposited on the intermediate layer of hydrophilic filter paper, thereby clearly indicating the presence of water in the tested fuel or the like.

An important feature of the invention is the fact that the relatively small inlet passage opening into cavity 30 provides a gentle turbulence within the cavity such that the fuel passing through the test cell will come into contact with water indicating member 62 during normal operation. There is no actual flow through filter paper 62, but it is evident that any water within the fuel will cause the dye on the lower surface 63 to be deposited on the filter paper to indicate the presence of water.

Portion 46 of the second supporting member 45 is provided with a substantially annular groove 65, and a substantially disc-shaped screen member 66 is disposed in the upper portion of the groove. A substantially disc-shaped filter member 67 is mounted in the lower portion of the groove and is maintained in proper operative position within the second support means. Filter member 67 is preferably made of a suitable hydrophobic filter, such as a glass fiber filter identified as 934–AH manufactured by the Hurlburt Paper Company. This type of filter paper is quite hydrophobic and also traps solid particles of submicronic size. An additional function performed by filter member 67 is the fact that it will tend to coalesce small water droplets present in the fuel at the lower surface thereof such that the enlarged coalesced droplets of water will be carried downwardly by the turbulence in the cavity within the body means and into engagement with water indicating member 62 thereby causing the water soluble dye to be deposited on the water indicating member.

As mentioned previously, filter disc 50 formed of sintered bronze spheres is located closely adjacent to and above the second support means and is mounted firmly within cap member 12. The sintered bronze filter 60 may serve the additional function of neutralizing the electrical charges or any contaminants which are present in the fuel.

Referring now to Fig. 3, the general principle of the invention is somewhat schematically illustrated. Incoming fuel passes through inlet port 31 into the interior of the cavity in the body means where, due to the relationship of the inlet port and the size of the cavity, gentle turbulence is produced thereby causing the fuel to impinge upon the upper surface of water indicating member 62. The fuel will readily pass through the thickness of water indicating member 62 since it has been treated to be readily wettable, and any water which is entrained in the fuel will immediately cause the impregnated dye on the lower surface of the member to be deposited on the upper surface thereof for indicating the presence of water. The fuel will pass upwardly through hydrophobic filter element 67 and the sintered bronze filter element 50 and then to the outlet of the cell. Any water which initially escapes detection by member 62 will pass upwardly within the fuel whereupon the small droplets will be coalesced by filter element 67 such that they will drop back down due to the turbulence and then impinge upon water indicating member 62.

After the fuel has been pumped through the line, the test cell may be quickly disassembled and support members 40 and 45 removed. Filter elements 62 and 67 are then carefully examined to determine the presence of water or submicronic particles respectively. The presence of water will be indicated by dye stains on the filter element 62 and accordingly will be readily visible, and any submicronic particles which have been separated from the fuel will be readily apparent on the undersurface of filter element 67. New filter elements may then be inserted in the support members 40 and 45, and the entire test cell may be re-assembled and employed for a subsequent test run.

Referring now to Fig. 4, a test cell indicated generally by reference numeral 70 is illustrated as connected in a pumping line 71, the fuel flowing therethrough in the direction indicated by the arrows. A valve 72 is provided in the fuel line, and the pressure drop occurring between the two points 73 and 74, at which the test cell is connected in the pumping line is sufficient to cause flow of fuel through lines 75 and 76 connected to the inlet and outlet ports respectively of the test cell.

Referring now to Fig. 5, another arrangement is disclosed wherein the test cell 80 is mounted in a fuel line 81, conduits 82 and 83 being connected at one end to flanges 84 and 85 respectively formed about the fuel line, the fuel flowing in the direction indicated by the arrows. A standard orifice plate 86 is inserted in the fuel line to give it a pressure differential sufficient to cause adequate flow of fuel in the test cell.

As illustrated in Fig. 6, a test cell 90 is shown as being connected to a fuel line 91, the fuel flowing in the direction of the arrows. In this modification, a conduit 92 connects the fuel line with the inlet port of the test cell, and the outlet port of the test cell is connected through a conduit 93 to a separate container (not shown).

It is apparent from the foregoing description that the test cell according to the present invention is adapted to be connected with any type of conventional fuel line for testing the fuel pumped therethrough. The test cell according to the present invention is quite sensitive to very small amounts of water and also provides an accurate indication of the presence of submicronic particles in the test fuel. The device is quite compact, simple and inexpensive in construction, and yet is quite reliable and efficient in operation. The device may be readily assembled and disassembled for easy inspection of the filter elements thereof and replacement when necessary. The device provides a very good visual indication of the presence of undesired contaminants in fuel, and the test cell may be operated even by relatively inexperienced personnel.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A cell for testing hydrocarbon fuels comprising a body means having a cavity formed therein, said body means having inlet and outlet means formed therein and in communication with said cavity, water indicating means mounted in said body means and in communication with said cavity, said water indicating means being readily wettable and having one surface thereof impregnated with a water soluble dye substantially completely inert to hydrocarbon, said one surface facing away from said cavity, and a hydrophobic filter medium spaced from said water indicating means and mounted in said body means and in communication with said cavity and said outlet means.

2. Apparatus as defined in claim 1 including another filter medium disposed closely adjacent said first mentioned filter medium and comprising a plurality of sintered bronze spheres.

3. A cell for testing hydrocarbon fuels comprising a body means having a cavity formed therein, said body means having inlet and outlet means formed therein and in communication with said cavity, a layer of water indicating material mounted within said cavity, said layer including oppositely disposed surfaces, one of said surfaces facing the interior of said cavity and the other surface facing away from the interior of said cavity, said other surface including an impregnated water soluble dye substantially completely inert to hydrocarbons, said layer of material being readily wettable, a first hydrophobic filter means mounted within said cavity so as to be at an intermediate point in the path of fluid flow through the cell between said inlet and outlet means, and a second filter means mounted within said cavity closely adjacent said first filter means, said second filter means being formed of sintered bronze spheres, said filter means and said water indicating means being formed separately from said body means thereby enabling removal thereof.

4. Apparatus as defined in claim 3 wherein said first filter means is formed of glass fibers.

5. A cell for testing hydrocarbon fuels comprising a body means having a cavity formed therein and having inlet and outlet means formed therein in communication with said cavity, said inlet means connecting with said cavity at an intermediate portion thereof and having a cross-sectional area relatively small in comparison with said cavity for producing a gentle turbulent action to fluid passing through said cell, a water indicating member disposed at one end portion of said cavity, said water indicating member being readily wettable and having a water soluble dye inert to hydrocarbons impregnated in one surface thereof, said one surface facing away from the interior of said cavity, and a filter means disposed between said inlet and the opposite end portion of said cavity, said filter means being formed of glass fibers having hydrophobic characteristics and being adapted to separate submicronic particles from the fluid passing therethrough.

6. Apparatus as defined in claim 5 including an additional filter means disposed adjacent said first mentioned filter means and intermediate said first mentioned filter means and said other end portion of the cavity, said additional filter means being formed of sintered bronze spheres connected to one another at mutual tangential points of contact.

7. A cell for testing hydrocarbon fuels comprising a base member, a spacer member, and a cap member, a first support member having a water indicating member mounted therein, said water indicating member comprising a sheet of readily wettable material having the undersurface thereof impregnated with a water soluble dye which is substantially completely inert to hydrocarbons, said first support member being adapted for mounting between said base member and the inner surface of said spacer member, a second support member having a hydrophobic filter member mounted therein, said second support member being adapted for mounting between said spacer member and said cap member, means for securing said base member, said spacer member and said cap member to one another and clamping said first and second support members therein so as to provide a rigid structure, said spacer member and said cap member having openings formed therein defining a closed cavity therewithin and inlet and outlet means in communication with the interior of said cavity, said inlet means being connected with the interior of said cavity at an intermediate point of said spacer member, said outlet means being in communication with the end of said cavity opposite from the end at which said water indicating member is disposed.

8. Apparatus as defined in claim 7 including an additional filter member formed of a plurality of sintered bronze spheres connected to one another at mutual tangential points of contact, said additional filter member being supported within said cap member.

9. Apparatus as defined in claim 7 wherein said base member, said spacer member and said cap member are secured to one another by a nut and bolt assembly and are readily disassembled from one another to permit replacement of the water indicating and filter members.

10. A cell for testing hydrocarbon fuels comprising a base member having an upper surface, a spacer member having an upper and lower surface, the lower surface of said spacer member being adapted to be juxtaposed with the upper surface of the base member, a cap member having a lower surface, the upper surface of said spacer member being adapted to be juxtaposed with the lower surface of said cap member, said spacer member having a central cavity formed therein, a first slot formed in said lower surface of the spacer member and communicating with the central cavity therein, a second slot formed in the upper surface of said spacer member and in communication with the central cavity therein, a first support member having a water indicating member mounted therein, said water indicating member being readily wettable, said water indicating member having an undersurface impregnated with a water soluble dye which is substantially completely inert to hydrocarbons, said first support member including a handle portion snugly fitted within said first slot, a second support member having a hydrophobic filter means mounted therein, said second support member including a handle portion snugly fitted within said second slot, a sintered bronze filter mounted within said cap member adjacent said second support member, said spacer member having an inlet port formed therein in communication with said central cavity, said cap member having a cavity formed therein, and an outlet conduit formed therein in communication with said last mentioned cavity.

11. Apparatus as defined in claim 10 wherein said base member, said spacer member and said cap member have aligned longitudinally extending openings formed therein, bolt means mounted within said aligned openings, nut means associated with the outer ends of said bolt means for clamping said base member, said spacer member and said cap member as a rigid unit, and spring means disposed in surrounding relationship to said bolt means and interposed between said base member and said spacer member and between said spacer member and said cap member.

12. A cell for testing hydrocarbon fuels comprising a body means having a cavity formed therein, said body means having an inlet and an outlet formed therein, said inlet and outlet being in communication with said cavity, and water indicating means comprising a layer of readily wettable porous material having opposite surfaces, one surface of said material being impregnated with a water soluble dye which is inert to hydrocarbons, and the opposite surface of the layer of material being in communication with said cavity for engaging fluid passing through the cavity.

13. For use in a test cell for hydrocarbon fuel, a water indicating member comprising a plate-like member comprising a layer of wettable material having on one side only thereof a water soluble dye.

References Cited in the file of this patent

UNITED STATES PATENTS

| | | |
|---|---|---|
| 2,214,354 | Snelling | Sept. 10, 1940 |
| 2,325,657 | Burkness | Aug. 3, 1943 |
| 2,787,238 | Luce | Apr. 2, 1947 |
| 2,815,662 | Thomas | Dec. 10, 1957 |
| 2,844,026 | Weschineyer | July 22, 1958 |

FOREIGN PATENTS

| | | |
|---|---|---|
| 563,182 | Great Britain | Aug. 2, 1944 |